United States Patent
Ghodbane

[11] Patent Number: 5,898,995
[45] Date of Patent: May 4, 1999

[54] METHOD OF MANUFACTURE OF A PRIMARY HEAT EXCHANGER JACKETED BY A SECONDARY HEAT EXCHANGER

[75] Inventor: Mahmoud Ghodbane, Lockport, N.Y.

[73] Assignee: General Motors Corporation, Detroit, Mich.

[21] Appl. No.: 08/937,053

[22] Filed: Sep. 24, 1997

[51] Int. Cl.$^6$ .................................................. B23P 15/26
[52] U.S. Cl. ........................ 29/890.03; 29/890.036; 29/890.045
[58] Field of Search .................. 165/140; 29/890.03, 29/890.035, 890.036, 890.045, 890.06, 890.07

[56] References Cited

U.S. PATENT DOCUMENTS

| | | | |
|---|---|---|---|
| 2,819,592 | 1/1958 | Smith | 165/140 |
| 2,993,682 | 7/1961 | Huet | 165/140 |
| 3,201,861 | 8/1965 | Fromson et al. | 29/455 |
| 4,448,242 | 5/1984 | Andres et al. | 165/140 |
| 5,123,480 | 6/1992 | Dixit | 165/140 |
| 5,409,058 | 4/1995 | Yuasa et al. | 165/140 |
| 5,419,392 | 5/1995 | Maruyama | 165/140 |
| 5,462,113 | 10/1995 | Wand | 165/140 |

*Primary Examiner*—I. Cuda
*Attorney, Agent, or Firm*—Patrick M. Griffin

[57] ABSTRACT

A composite heat exchanger has an inner, serpentine circuit fluidly isolated from a surrounding outer, parallel flow circuit, allowing two different heat exchange media to be in thermal contact without physical mixing. A series of longer, inner tubes are bent into a U shape, with the parallel legs of each arm of the U jacketed by surrounding, outer tubes. Header plates are inserted over the outer tubes, moved to a spaced apart relation, and then all but the first and last inner tube ends are joined by separate U shaped junctions to created the primary, serpentine circuit. Finally, manifold tanks are attached to the header plates, covering, but fluidly isolated from, the U shaped junctions of the serpentine circuit. Corrugated fins are installed between the parallel surfaces of adjacent outer tubes.

1 Claim, 5 Drawing Sheets

METHOD OF MANUFACTURE OF A PRIMARY HEAT EXCHANGER JACKETED BY A SECONDARY HEAT EXCHANGER

TECHNICAL FIELD

This invention relates to methods of manufacture of heat exchangers in general, and specifically to manufacturing a primary heat exchanger that is jacketed or surrounded by an independently operating secondary heat exchanger, in a compact package.

BACKGROUND OF THE INVENTION

Heat exchangers typically are single units, in which a regularly spaced plurality of generally parallel flow tubes carry a flow medium, such as refrigerant or radiator coolant, with air blown perpendicular to and over the outside of the flow tubes to transfer heat to or away from the tubes. Composite heat exchangers in which one heat exchanger is fixed in front of the other as a modular unit, such as a radiator dualed with a condenser, have been proposed. But these typically share no more components than is necessary to simply physically attach them together for simultaneous installation. Shell type, tube within concentric tube, heat exchangers are known, but these are typically liquid to liquid heat exchangers, and still constitute only a single unit, rather than first, independently operating heat exchanger surrounded or jacketed by a second.

There may be applications in the future requiring that a primary, inner heat exchanger be contained within and jacketed by, a secondary heat exchanger. The outer, surrounding heat exchanger could carry a secondary flow medium of differing properties from the primary medium. The primary heat exchange medium could be confined to an isolated location within its circuit, while the secondary heat exchange medium alone could flow back to a vehicle passenger space or the like, where it was desired not to expose the passenger space to the primary heat exchange medium. The two heat exchange media would be thermally conductive, but not physically mixed. Patented methods exist for producing inner tubing jacketed by an outer, surrounding tubing, and it is suggested that such could be used for a heat exchanger. However, there is no design known for practically and compactly jacketing a primary heat exchanger within a secondary heat exchanger.

SUMMARY OF THE INVENTION

The subject invention discloses a method for producing a composite, jacketed tube of novel design, and then assembling that jacketed tubing with other, shared components to create a compact package of a primary serpentine heat exchanger within a secondary, parallel flow heat exchanger.

In the preferred embodiment of the method disclosed, a basic core width, defined between a pair of parallel header plates, is a given quantity. A thinner, inner tubing is first formed, as by extruding, in a typical, multi hole, flat tube configuration. The inner tubing is cut into lengths sufficient to allow it to be bent evenly into a U shape with two spaced, parallel legs, each substantially as long as the core is wide. Next, a hollow, thicker outer tubing is formed, sized to fit closely over the inner tubing with a jacket space all the way around. The thicker tubing is cut into a pair of pieces substantially as long as the core width, one piece for each leg of the U shaped inner tubing. Then, each pair of thicker, shorter jacketing tubes is fitted over the outside of the inner tube to create a composite tube.

The header plates have a series of regular slots spaced apart to match the spacing of the legs of the composite tube, and wide enough to receive the thicker, outer tubes. This allows both header plates to be fitted over the ends of each leg of the composite tubes and moved to the basic core width. This fixtures the open inner tube ends of the composite tubes in a regular spacing. Next, all of the adjacent pairs of open inner tube ends, but for the first and last, are joined by separate U shaped junctions, similar in shape to the integral U shaped junctions, and alternating therewith. This creates a basic, primary serpentine heat exchanger, complete but for inlet and outlet. Then, a pair of manifold tanks of sufficient depth to contain the various integral and separate U shaped junctions on each side of the core are fitted to the header plates. This serves to fluidly connect all of the parallel jacket spaces into a parallel flow secondary heat exchanger, complete but for inlet and outlet. A suitable inlet and outlet are fixed to the remaining first and last open inner tube ends, extending through the manifold tank walls in sealed fashion, and an inlet and outlet are formed in the manifold tanks to complete the secondary, parallel flow heat exchanger. A primary heat exchange medium fed into the serpentine heat exchanger flows through the inner tubes while a secondary heat exchange medium, when fed into the manifold tanks, flows through the jacket spaces only. Thermal conduction between the two media is possible across the walls of the inner tubes, but physical mixing of the two media is prevented.

BRIEF DESCRIPTION OF THE DRAWINGS

These and other features of the invention will appear from the following written description, and from the drawings, in which.

DESCRIPTION OF THE PREFERRED EMBODIMENT

Figure 8:
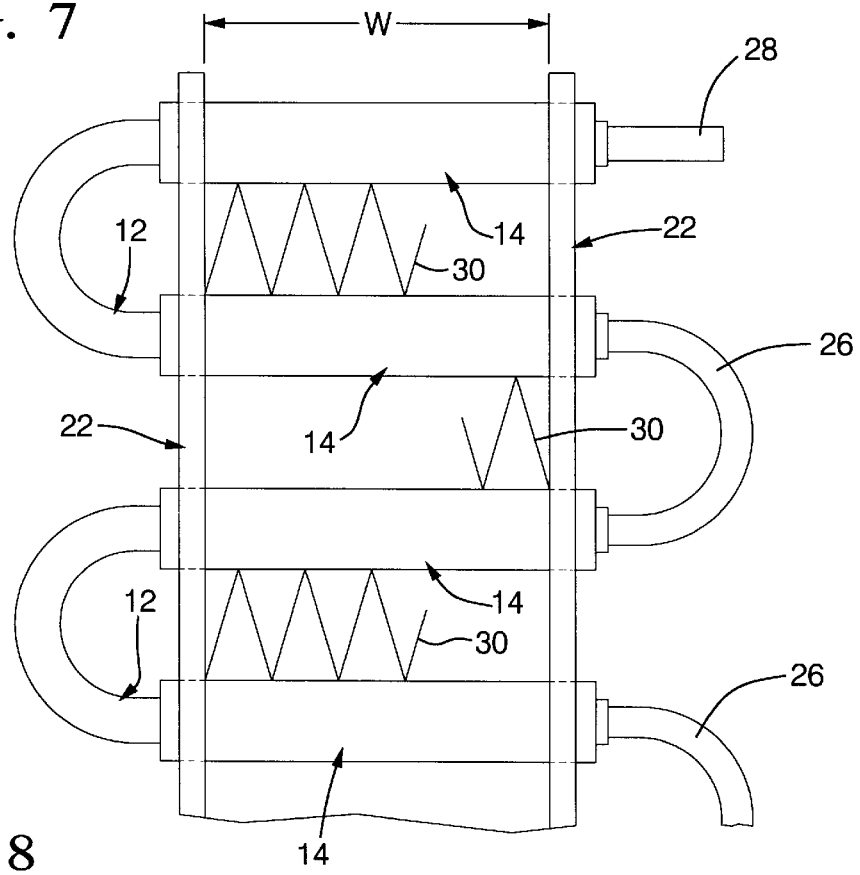
FIG. 8 shows the header plates and U junctions fixed to the composite tubes.

Referring first to FIG. 8, a completed core, described in more detail below, has a width W, and also has an overall area predetermined by the area available to mount it, and the thermal capacity required for its particular application. This will also determine the number of flow tubes necessary, and their spacing. The method of the invention works within those given constraints. No particular values are given here for those predetermined values, which would vary from case to case.

Figure 1:
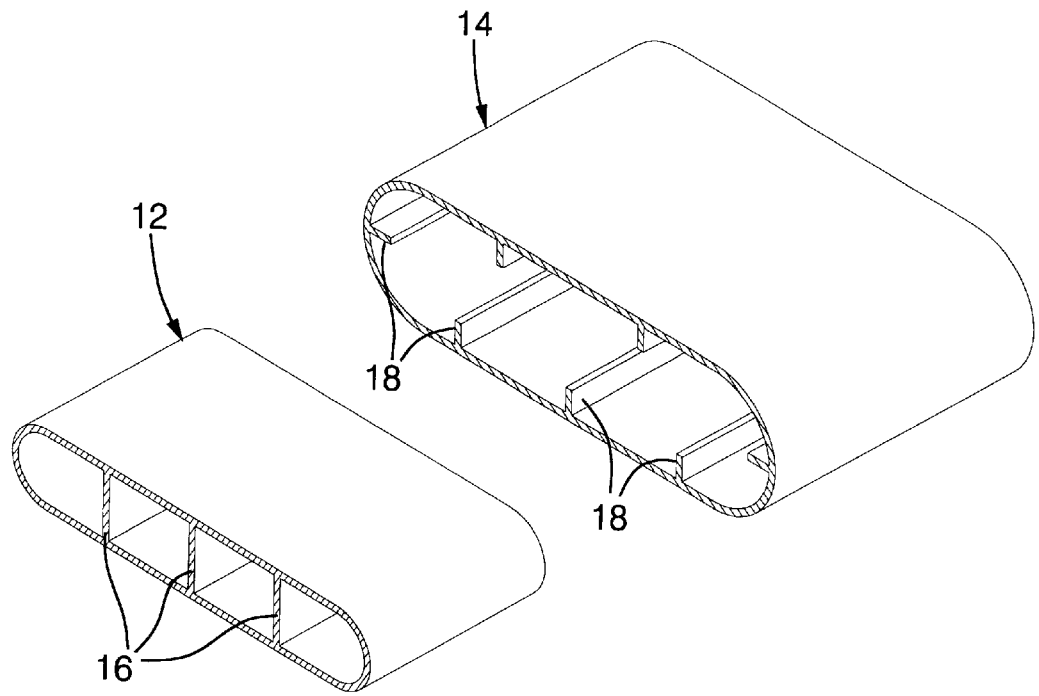
FIG. 1 is a perspective view of the open ends of short sections of both an inner tube and an outer tube that jackets it.
Figure 4:
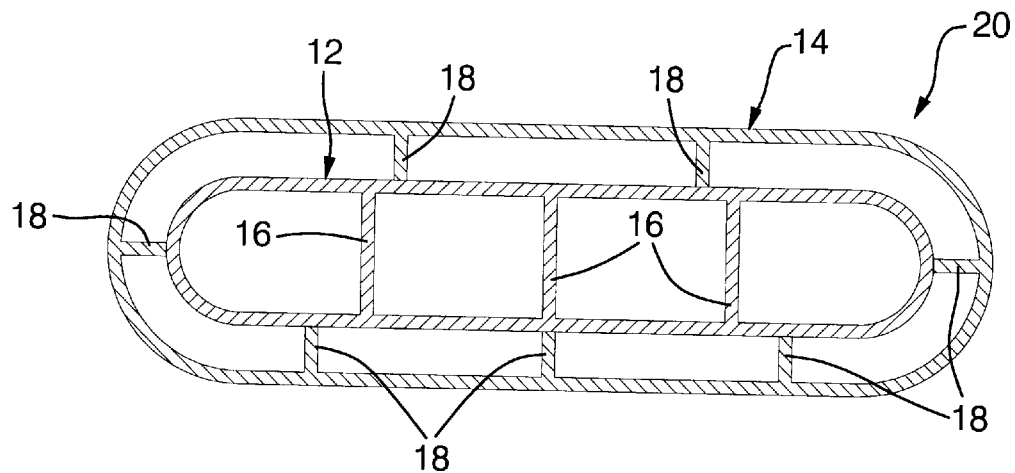
FIG. 4 is a cross section of a completed composite tube taken along the line 4—4 of FIG. 3.

Referring next to FIGS. 1 and 4, a supply or stock of tubing is first produced, which is later cut to length, including a thinner, inner tube, indicated generally at 12, and a thicker, outer jacketing tube, indicated generally at 14. Inner tube 12, as disclosed, is an integral, flat hollow tube of typical cross section, with four interior passages defined by three interior webs 16. No particular thickness is specified, just the fact that it is the thinner of the two. The outer tube 14 is relatively thicker, as well as wider, than inner tube 12, providing space for a plurality of integral spacer webs 18 on its inner surface. The edges of the spacer webs 18 terminate on an envelope that just matches the outer surface of the inner tube 12, so that it may be smoothly and closely inserted over the inner tube 12, and later brazed in place to create a composite tube. Doing so creates a jacket space of substantially constant surrounding the entire outer surface of inner tube 12, discrete from the interior of inner tube 12. Although technically feasible, the two initially separate tubes 12 and 14 are not themselves extruded as an integral piece, because the design of the composite tube into which they are ultimately combined, described next, makes it more practical to form them separately.

Figure 2:
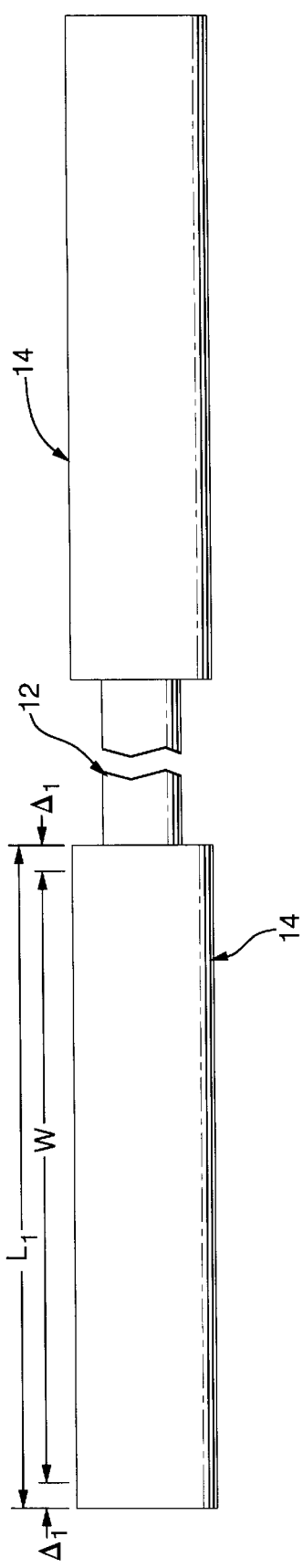
FIG. 2 shows a pair of shorter, outer tubes being fitted over a longer, inner tube.
Figure 3:
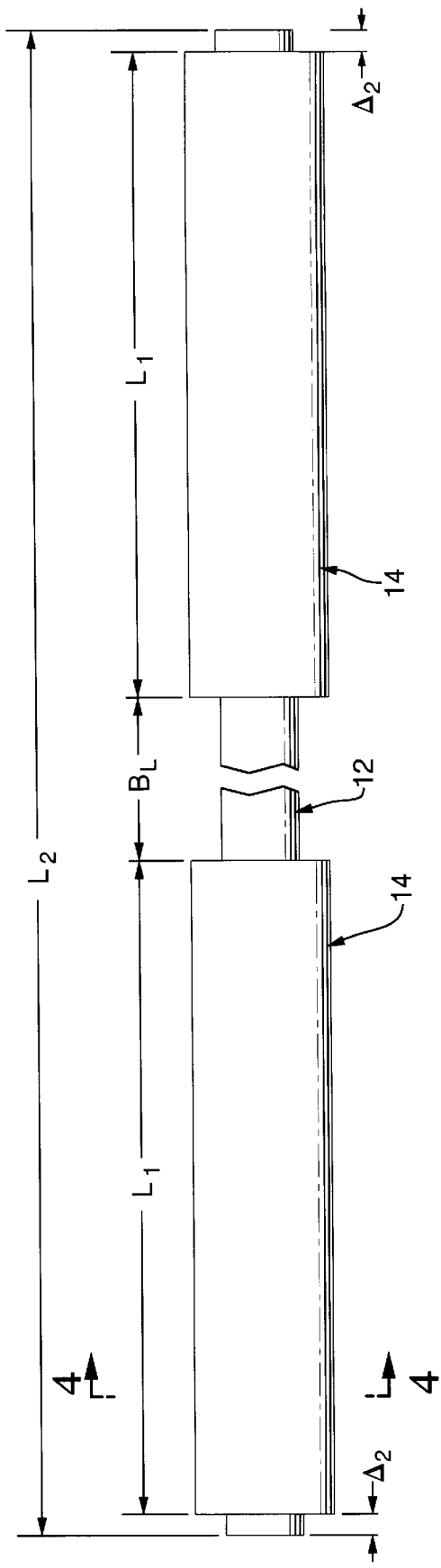
FIG. 3 shows the shorter, outer tubes moved to final position on and fixed to a longer inner tube, prior to bending.
Figure 5:
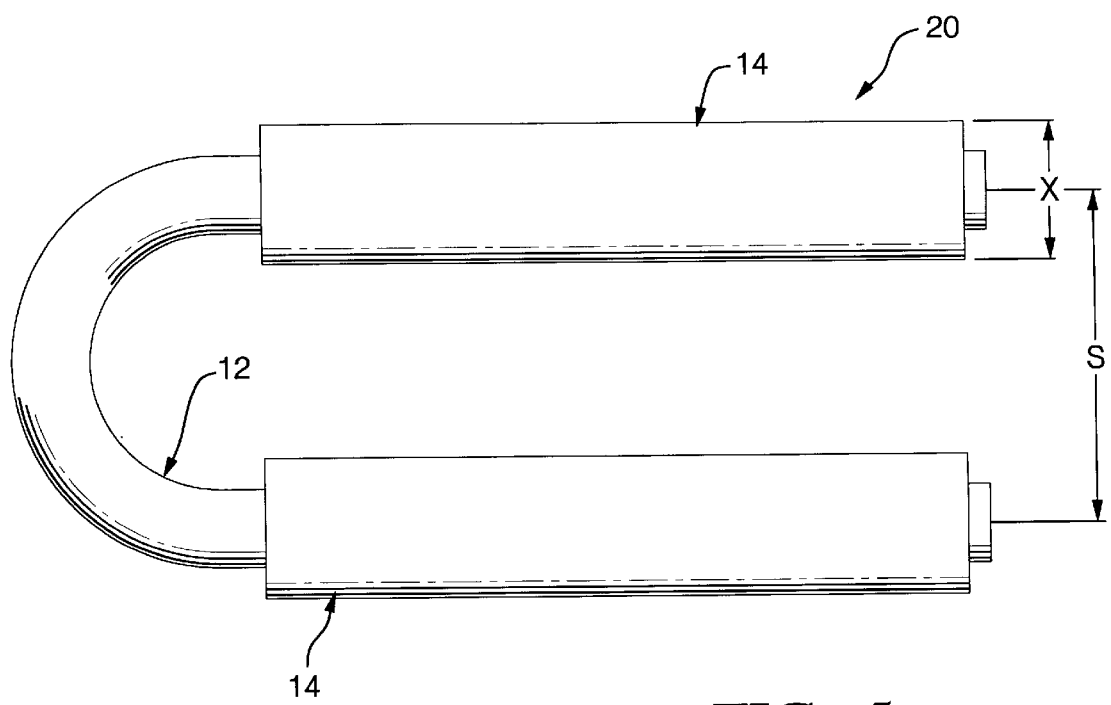
FIG. 5 shows a completed composite tube after being bent into a U shape.

Referring next to FIGS. 2, 3 and 5, a pair of identical lengths of the outer tube 14 are cut, still identified by number 14, each of which has a total end to end length L1 that is defined in terms of the given core width W, plus some additional length left for assembly purposes. Specifically, L1 is equal to the sum of W plus an additional length Δ1 at each end that allows for later insertion through a header plate, described in detail below. The inner tubes 12 are cut to longer lengths, defined in terms of the length of the outer tubes 14, plus other quantities also related to manufacturing and assembly concerns. Specifically, each inner tube 12 is cut to a length L2 that is the sum of twice L1, plus an additional length Δ2 at each end comparable to Δ1 (and serving the same purpose), plus, most significantly, an extra tube length B1, shown at the center in FIG. 3. B1 is a tube bend length, an allowance of extra length which is sufficient to allow the inner tube 12 to be bent into an even U shape, as shown in FIG. 5. This creates parallel, equal length arms, spaced apart by a distance S, and joined by an integral junction on one side with aligned open tube ends at the other side. To create the composite tube indicated at 20 in FIG. 5, various intermediate steps could be carried out in several possible orders. Most likely, the inner tube 12 would be bent into an even, symmetrical U shape first, and then the outer, jacketing tubes 14 would be inserted over the parallel arms into the evenly spaced orientation shown in FIG. 5. At that point, the outer tubes 14 could be fixed to the bent inner tube 12 by brazing or other means, or the actual brazing operation could be left until later in the process. Theoretically, the outer tubes 14 could be inserted onto the straight inner tube 12 to the evenly spaced location shown in FIG. 3, and fixed in place with the tube bend length B1 left at the center. Then, the inner tube 12 bent as a last step. However, the orientation of the outer tubes 14 relative to the inner tube 12 shown in FIG. 3 is more for the purposes of illustrating their relative lengths, and is not an indication that they would necessarily be fixed to the inner tube 12 before it was bent, although they could be. Whether fully brazed or not, the composite tube 20 shown in FIG. 5 still has a pair of inner tubes 12, each surrounded by a jacket space created by the outer tubes 14. The composite tubes 20 represent an intermediate building block or subassembly from which the final product is assembled.

Figure 6:
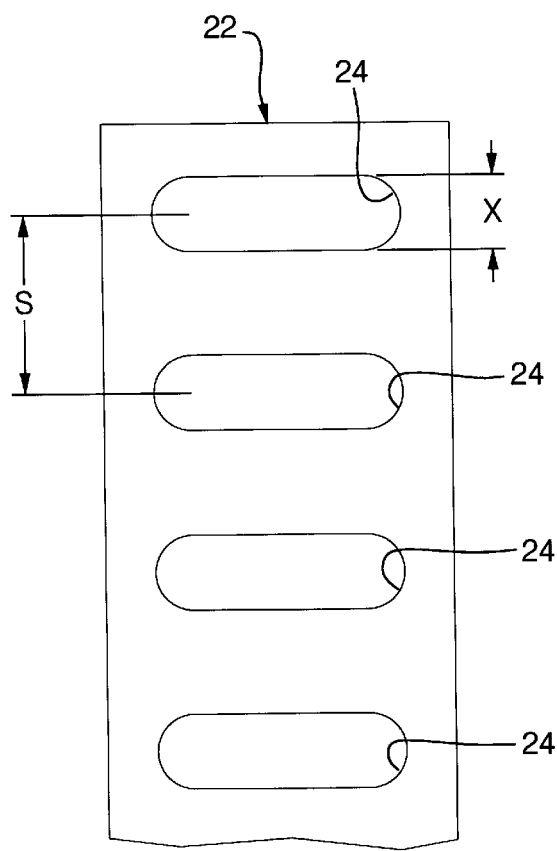
FIG. 6 shows the slots in the upper portion of a header plate.
Figure 7:
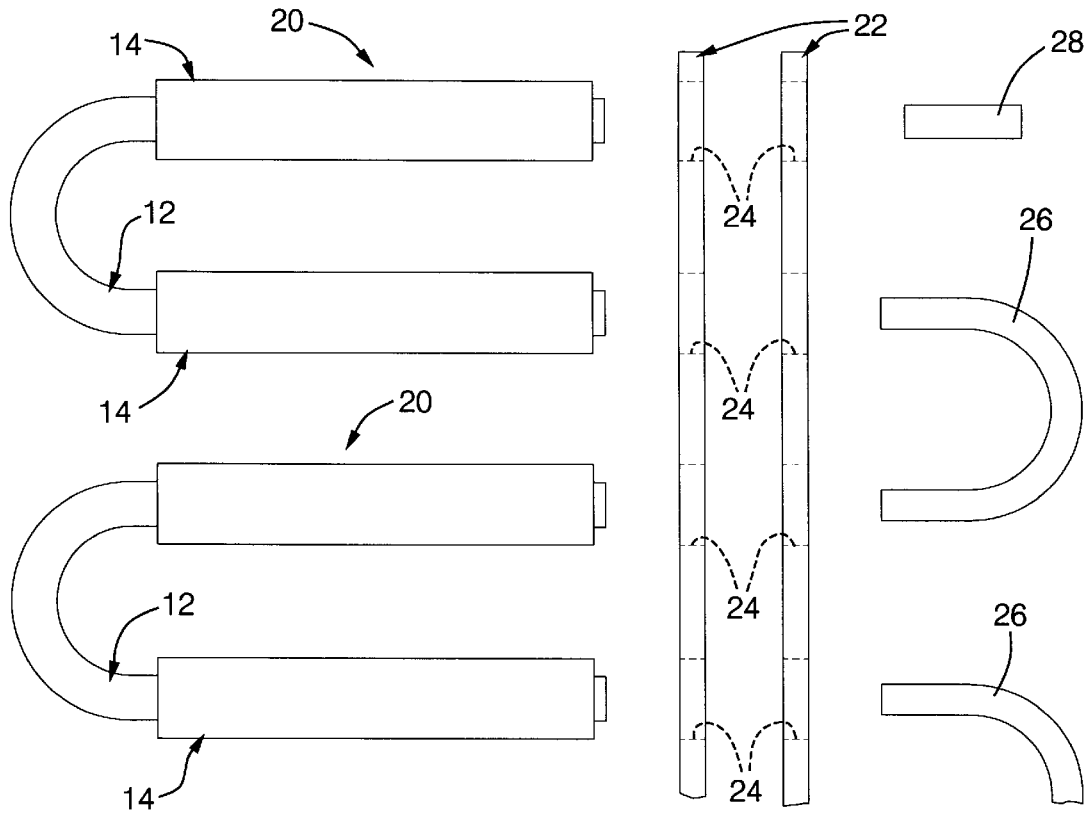
FIG. 7 shows upper portions of the header plates aligned with two bent composite tubes, and two of the separate U junctions aligned therewith.

Referring next to FIGS. 6, 7 and 8, a pair of header plates, the end of one of which is indicated generally at 22, each has a series of regularly spaced slots 24 with a thickness equal to the thickness of the outer tubes 14, and with the same regular spacing S. The number of slots 24 in each plate 22 would be twice the number of composite tubes 20 needed. One pair of header plates would be inserted over the composite tubes 20, from the open tube end side. (The plates 22 could not be inserted from the other side, of course, because of the U shaped junctions.) The plates 22 are moved, at least roughly, to the predetermined spacing W, as the slots 24 slide over the outside of the outer tubes 14. This would serve to temporarily fixture the composite tubes 20 in a regularly spaced pattern. Then, a series of separate U shaped junctions 26 would be used to interconnect all adjacent pairs of open tube ends 12, except for the first and last ones, diagonally opposed to the integral U shaped junctions on the other side. The separate U shaped junctions 26 would be of generally the same size and shape as the integral U shaped junctions, and would be plugged either internally or externally into the open inner tube 12 ends sufficiently tightly to allow for later formation of a braze seam. In addition, a short fitting tube 28, the upper one of which is shown, is inserted into the open ends of the first and last inner tubes 12, which are not plugged by a junction 26. Finally, a conventional corrugated cooling fin 30 is installed between each of the adjacent outer tubes 14, at least in an application where the heat exchanger would be subjected to a cross flow of air or other fluid. At this point, a basic core 32 has been assembled. The various components (composite tubes 20, plates 22, fins 30, etc.) may, at this point, be brazed and fixed together to complete a rigid core 32. They would first be fixtured so as to maintain the header plate spacing W, and to hold the junctions 26, fitting tubes 28 and fins 30 in place. Or, the brazing operation could be delayed until the very last step, depending on the features of a final component, described next. Either way, core 32 exists at this point, whether in a loosely assembled or rigidified form. The inner tubes 12 are all joined together fluidly, to create a serpentine, inner, primary heat exchanger, with an inner flow path that is complete end to end. It remains only to complete the surrounding secondary heat exchanger.

Figure 9:
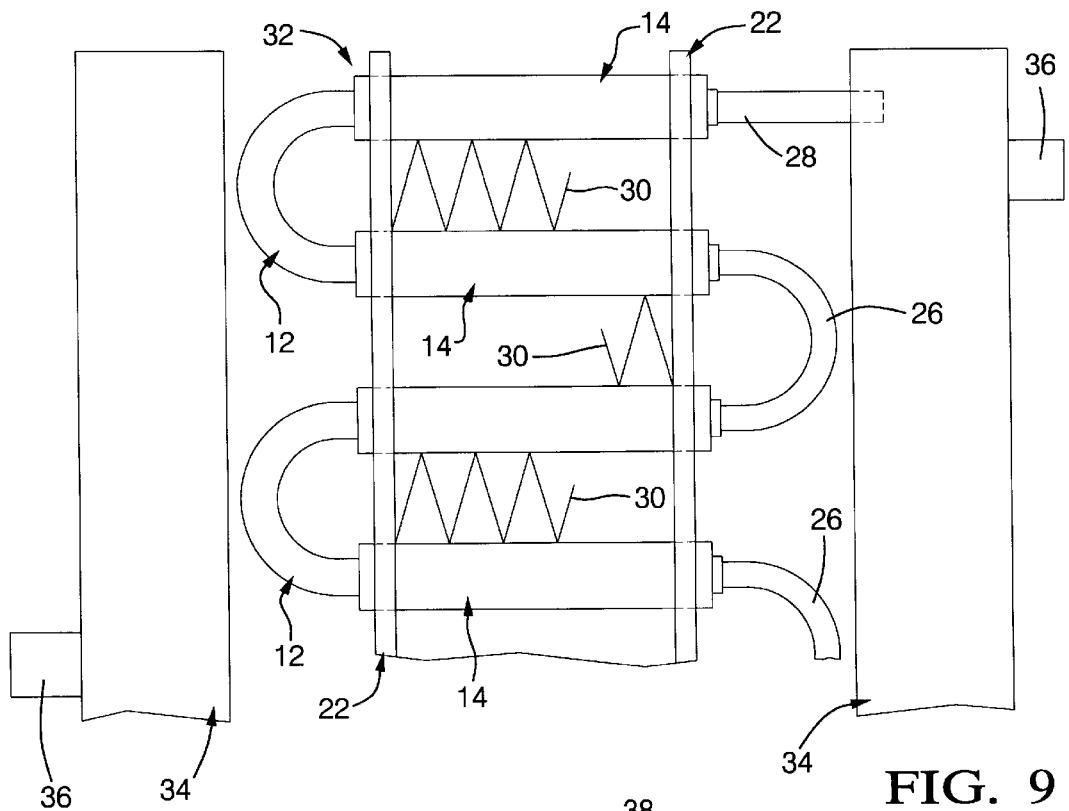
FIG. 9 shows the manifold tanks aligned with the header plates.

Referring next to FIG. 9, the secondary heat exchanger is completed by the addition, to each header plate 22, of a manifold tank, indicated generally at 34. Each tank 34 is deep enough to contain both the integral U shaped junctions and the separate junctions 26 on each side of core 32. One tank 34 would be slotted through its end wall to allow the fitting tubes 28 to closely slide through as it was attached to its respective header plate 22. The fitting tubes 28 are ultimately used for the inlet and outlet of a primary heat exchanger medium into the serpentine path of the inner tubes 12. Therefore, the interface between the slot in tank 34 and the fitting tube 28 would have to be sealed, either with an external seal, or by a later brazing process. Each tank 34 would also have an inlet/outlet fitting 36 to handle the flow of a secondary heat exchange medium into the tanks 34, or, in a case of multi pass flow, one tank 34 could contain both fittings 36, and the other tank 34 would serve as a return tank. The tank inlets and outlets 36 could be integral, or brazed on later. Whether the core 32 is brazed in an intermediate step, or as a last step, depends on the nature of the tanks 34 and how they are attached to the header plates 22. The core 32 will, generally, be metal, most likely aluminum. The manifold tanks 34 may be plastic, and crimped to the header plates 22 as radiator manifold tanks typically are, with a gasket seal. In that case, the core 32 would have been brazed together and rigidified first, since plastic tanks cannot run through the braze oven. However, if the manifold tanks 34 are of a like metal, then they can be brazed to the plates 22 along with all the other components of the core 32, in one, final brazing step.

Figure 10:
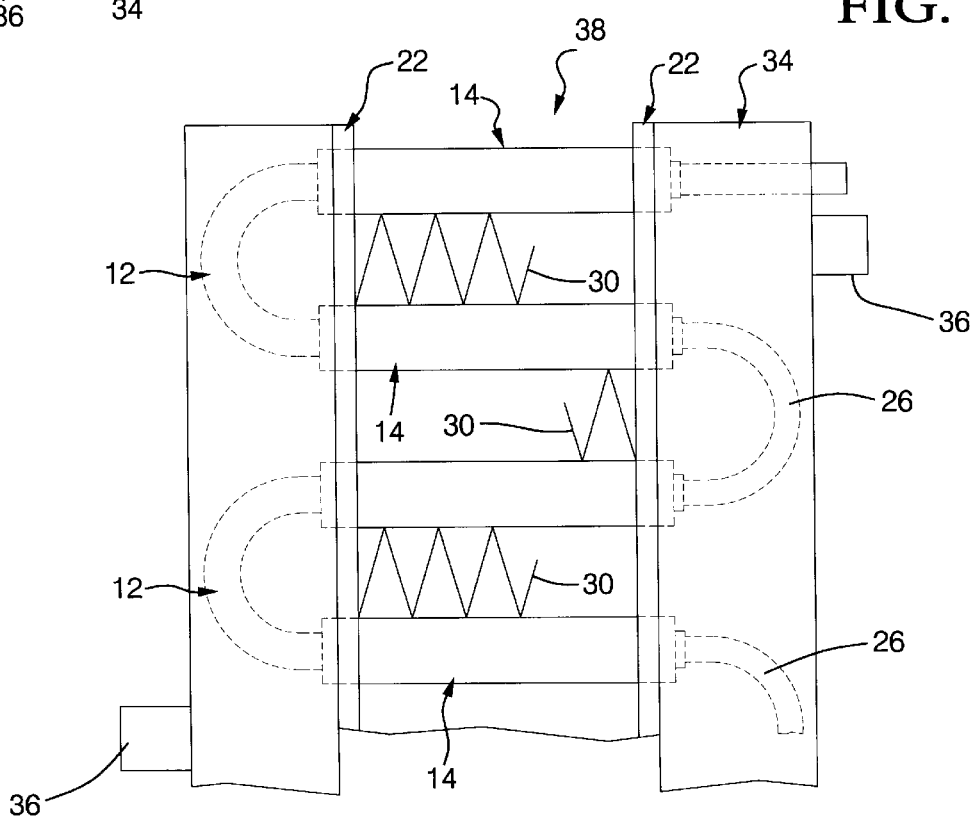
FIG. 10 shows the tanks fixed to the header plates to complete the composite heat exchanger.

Referring finally to FIG. 10, the completed composite heat exchanger of the invention, indicated generally at 38, has the fundamental capability of fluidly isolating two thermally conductive heat exchanger media from one another, in two separate, compact circuits.

The primary, inner heat exchanger is formed by the interconnected, serpentine inner tubes 12. A primary heat exchange medium flowing into and out of the fitting tubes 28 will flow through this primary heat exchanger, but will not and cannot enter the jacket spaces surrounding the inner tubes 12, nor can it enter the manifold tanks 34. Simultaneously, a secondary heat exchange medium flowing into and out of the manifold tanks through the fittings 36 will enter only the outer tubes 14, and flow only through the jacket spaces surrounding the inner tubes 12, (and the tanks 34), without entering the inner tubes 12. The two media are thereby kept totally separate, but are thermally conductive to and from one another across the shared walls of the inner tubes 12 (and, to a lesser extent, across the walls of the U shaped bends contained inside the manifold tanks 34.) The secondary medium flowing through the jacket spaces created by the outer tubes 14 can either pick up heat from, or transfer heat to, the primary medium flowing through the inner tubes 12. This process can be combined, as shown, with a cross flow of air or other fluid perpendicularly across the outer tubes 14, enhanced by the fins 30, as is typically done in a condenser.

Variations in the method steps disclosed, and to an extent, in the components, could be made. As already noted, the point in the process at which many of the components are fixed and rigidified to one another can be varied. The composite tubes could be truly integral, with the inner and outer tubes coextruded, rather than built up from separate inner and outer tubes. Enough of the outer tube could be machined away to leave a central bend length B1 before bending into the U shape. This would probably not be considered practical, however. The inner and outer tubes need not be flat, although that will be the most useful shape in most cases. An inner tube of lesser "thickness" (i.e., diameter) could fit inside a surrounding round outer tube. However, round tubes would have to be enhanced by a different kind of cooling fin, if a cooling fin were desired. The fitting tubes 28 could be eliminated as separate components by making one of the inner tubes 12 correspondingly longer and one arm of the U to be long enough to extend through the wall of the manifold tank 34. In addition, the last composite tube 20 in the core 32 could be cut in half, if desired, so as to put the inlet and outlet of the primary heat exchanger on opposite tanks 34. Therefore, it will be understood that it is not intended to limit the invention to just the embodiment disclosed.

I claim:

1. A method of manufacturing a composite heat exchanger including a primary heat exchanger surrounded by a hydraulically discrete, secondary heat exchanger, said secondary heat exchanger having a core of predetermined width as defined by parallel header plates, comprising the steps of;

forming a plurality of composite, U shaped tubes, each having a pair of, regularly spaced parallel arms longer than the predetermined width of said core, each air of parallel arms having an inner tube joined to the other inner tube of the pair by an integral U shaped junction and an open, inner end aligned in a pair with an open, inner end of the other inner tube of the pair, each inner tube also being surrounded by an open, outer tube each outer tube having a length substantially equal to the predetermined width of said core, a thickness greater than said inner tubes, and having a series of internal webs that slide fit closely over the outside of said inner tubes, thereby forming a jacket space surrounding each inner tube, providing a pair of header plates with a series of tube slots having a spacing equal to said regular spacing of said inner tubes and a thickness equal to the thickness of said outer tubes, installing each of said header plates over the outer tubes on each of said composite tubes to a separation substantially equal to the predetermined width of said core, thereby fixturing said composite tubes into a regularly spaced pattern, attaching a separate U shaped junction to interconnect each adjacent pair of inner tube open ends, diagonally opposed to the integral U shaped junctions, except the first and last inner tube open ends, thereby joining said inner tubes into a single, serpentine flow pattern comprising said primary heat exchanger with open first and last tube ends, joining a manifold tank to each of said header plates, thereby interconnecting said jacket spaces into a single, parallel flow pattern comprising said secondary heat exchanger discrete from said primary heat exchanger, fixing a primary inlet and outlet through said manifold tanks and into said first and last inner tube open ends, and, providing a secondary inlet and outlet into said manifold tanks, whereby, a primary heat exchange medium fed through said primary inlet and outlet flows in a serpentine pattern through said primary heat exchanger only, completely surrounded by, but hydraulically discrete form, said secondary heat exchange medium in said secondary heat exchanger.

\* \* \* \* \*